United States Patent
Takahashi et al.

(10) Patent No.: US 9,745,426 B2
(45) Date of Patent: Aug. 29, 2017

(54) METHOD FOR MANUFACTURING HEAT-SHIELDING FILM, HEAT-SHIELDING FILM, AND HEATSHIELDING CURTAIN

(71) Applicant: RIKEN TECHNOS CORPORATION, Tokyo (JP)

(72) Inventors: Tomohiro Takahashi, Tokyo (JP); Hidemasa Sugimoto, Tokyo (JP); Motoi Hiugano, Tokyo (JP)

(73) Assignee: RIKEN TECHNOS CORPORATION (JP)

( * ) Notice: Subject to any disclaimer, the term of this patent is extended or adjusted under 35 U.S.C. 154(b) by 0 days.

(21) Appl. No.: 14/904,624

(22) PCT Filed: Jun. 26, 2014

(86) PCT No.: PCT/JP2014/066967
§ 371 (c)(1),
(2) Date: Jan. 12, 2016

(87) PCT Pub. No.: WO2015/005120
PCT Pub. Date: Jan. 15, 2015

(65) Prior Publication Data
US 2016/0152780 A1 Jun. 2, 2016

(30) Foreign Application Priority Data
Jul. 12, 2013 (JP) ................ 2013-146575

(51) Int. Cl.
| | | |
|---|---|---|
| *C08K 3/10* | (2006.01) | |
| *A01G 9/24* | (2006.01) | |
| *C08J 3/20* | (2006.01) | |
| *C08J 5/18* | (2006.01) | |
| *C08L 27/06* | (2006.01) | |
| *C08L 51/04* | (2006.01) | |
| *A01G 9/14* | (2006.01) | |
| *C08K 9/02* | (2006.01) | |
| *C08K 3/22* | (2006.01) | |

(52) U.S. Cl.
CPC ............ *C08J 3/203* (2013.01); *A01G 9/1407* (2013.01); *C08J 5/18* (2013.01); *C08K 9/02* (2013.01); *C08L 27/06* (2013.01); *C08L 51/04* (2013.01); *C08J 2327/06* (2013.01); *C08K 2003/2231* (2013.01); *C08L 2205/03* (2013.01)

(58) Field of Classification Search
CPC .......... C08J 3/203; C08J 5/18; C08J 2327/06; C08L 27/06; C08L 51/04; C08L 2205/03; C08K 2003/2231; C08K 9/02; A01G 9/1407
USPC ................... 523/135; 524/434, 409
See application file for complete search history.

(56) References Cited

FOREIGN PATENT DOCUMENTS

| | | |
|---|---|---|
| JP | 2002-369629 A | 12/2002 |
| JP | 2006-314218 A | 11/2006 |
| JP | 2007-222061 A | 9/2007 |
| JP | 2011-99038 A | 5/2011 |
| JP | 2012-141353 A | 7/2012 |
| JP | 2012-517517 A | 8/2012 |

OTHER PUBLICATIONS

PCT/JP2014/066967 International Search Report dated Sep. 30, 2014; 5pgs.

*Primary Examiner* — David Karst
(74) *Attorney, Agent, or Firm* — Bracewell LLP; Brad Y. Chin

(57) ABSTRACT

Embodiments relate to a method for manufacturing a heat-shielding film in which a heat-shielding material has been well dispersed in a polyvinyl chloride resin. According to one embodiment, the method for manufacturing the heat-shielding film includes (1) mixing a polyvinyl chloride resin composition (P) containing the polyvinyl chloride resin (A) using a blender, and (2) adding and further mixing the heat-shielding material with the mixture obtained in step (1 The heat-shielding material contains at least antimony-doped tin oxide micro-particles (B) in an amount in which the mass ratio of the polyvinyl chloride resin (A) to antimony-doped oxidized tin micro-particles (B) is 100 parts by mass to 1.5 to 15 parts by mass. The heat-shielding material is composed of antimony-doped oxidized tin micro-particles (B) alone.

5 Claims, No Drawings

METHOD FOR MANUFACTURING HEAT-SHIELDING FILM, HEAT-SHIELDING FILM, AND HEATSHIELDING CURTAIN

CROSS REFERENCE TO RELATED APPLICATION

This application claims the benefit of and priority to PCT/JP2014/066967 filed on Jun. 26, 2014, entitled (translation), "METHOD FOR MANUFACTURING HEAT-SHIELDING FILM, HEAT-SHIELDING FILM, AND HEAT-SHIELDING CURTAIN," which claims the benefit of and priority to Japanese Patent Application No. 2013-146575, filed on Jul. 12, 2013, all of which are hereby incorporated by reference in their entirety into this application.

BACKGROUND

Field of the Invention

Embodiments of the invention relate to a method for producing a thermal barrier film composed of a polyvinyl chloride resin composition. More specifically, embodiments of the invention relate to a method for producing a thermal barrier film composed of a polyvinyl chloride resin composition, the film having high visible light transmittance while showing thermal barrier properties by efficiently blocking near-infrared rays of sunlight during daytime, thus being capable of suppressing temperature increase inside agricultural and horticultural facilities such as agricultural and horticultural greenhouses, and having low heat transmission at night, thus being capable of reducing heat dissipation from the agricultural and horticultural facilities.

Description of the Related Art

Conventionally, agricultural and horticultural facilities such as agricultural and horticultural greenhouses that use resin films such as polyvinyl chloride resin films, polyethylene resin films, and fluorine-containing polymer resin films as roofing materials or wall materials have been utilized in farming agricultural and horticultural crops. Such agricultural and horticultural facilities are used for purposes such as heat retention, wind protection, rain protection, and snow protection during winter, and are used for purposes such as wind protection, rain protection, insect protection, and insect pollination during summer. However, in the case of agricultural and horticultural crops such as strawberry and lettuce, the growth of which is disturbed by high temperatures inside the agricultural and horticultural facilities due to exposure to strong sunlight, the agricultural and horticultural facilities that use such resin films mentioned above as roofing materials or wall materials have a disadvantage of the need for countermeasures such as temperature adjustment by covering them with cheesecloths or shading nets or partially opening the roof or the wall. Therefore, there has been a demand for agricultural and horticultural facilities that do not require such complicated countermeasures also in the case of agricultural and horticultural crops such as strawberry and lettuce. Further, it is desired to show heat retention properties at night while expressing thermal barrier properties during daytime, in the season when the diurnal range of temperature is large.

Therefore, as techniques for such an application, films that transmit visible light, while showing thermal barrier properties by blocking near-infrared rays have been proposed as materials for agricultural and horticultural facilities according to the conventional art. However, it is difficult to well disperse a thermal barrier material in a resin that is a polymer material. Conventional art, for example, JP 2002-369629 A, discloses an agricultural and horticultural heat insulating material including a heat insulating layer composed of a resin substrate in which a heat insulating filler selected from lanthanum hexaboride and antimony-doped tin oxide is dispersed. Further, conventional art, for example, JP 2002-369629 A, discloses a method for producing a heat insulating material including simultaneously mixing a heat insulating filler and a resin material. However, in the method disclosed in JP 2002-369629 A, dispersion of the thermal barrier material is insufficient. Meanwhile, conventional art also discloses resin films including a thermoplastic resin film containing titanium oxide (see, for example, JP 2006-314218 A and JP 2007-222061 A). However, the techniques of these conventional art references exhibit a low shielding factor from near-infrared rays and have insufficient thermal barrier properties.

SUMMARY

Embodiments of the invention provide a method for producing a thermal barrier film in which a thermal barrier material is well dispersed in a polyvinyl chloride resin.

In order to solve the above problem, embodiments of the invention have the following features:

A method for producing a thermal barrier film including the steps of: (1) mixing a polyvinyl chloride resin composition (P) containing a polyvinyl chloride resin (A) using a blender, and (2) adding, to the mixture obtained by the step (1), a thermal barrier material containing at least antimony-doped tin oxide particles (B) in an amount such that a mass ratio of the polyvinyl chloride resin (A) to the antimony-doped tin oxide particles (B) is 100 parts by mass:1.5 to 15 parts by mass, followed by further mixing.

In step (1) preceding step (2) described above, it is preferable that all ingredients of the thermal barrier film except for the thermal barrier material containing at least the antimony-doped tin oxide particles (B) be mixed. The aforementioned thermal barrier material may consist only of the antimony-doped tin oxide particles (B). In such a case, it is preferable that all ingredients except for the antimony-doped tin oxide particles (B) be mixed in step (1).

The production method, according to various embodiments of the invention, allow a thermal barrier film in which a thermal barrier material is well dispersed in a polyvinyl chloride resin to be obtained. Further, the thermal barrier film to be obtained has excellent heat retention properties due to its high visible light transmittance and low heat transmission, while showing thermal barrier properties by efficiently blocking near-infrared rays. Therefore, the thermal barrier film obtained by the production method of the present invention is suitable as a material such as a roofing material and a wall material for agricultural and horticultural facilities such as agricultural and horticultural greenhouses.

According to at least one embodiment, there is provided a method for producing a thermal barrier film, including the steps of (1) mixing a polyvinyl chloride resin composition (P) including a polyvinyl chloride resin (A) using a blender, and (2) adding, to a mixture obtained by the step (1), a thermal barrier material including at least antimony-doped tin oxide particles (B) in an amount such that a mass ratio of the polyvinyl chloride resin (A) to the antimony-doped tin oxide particles (B) is 100 parts by mass:1.5 to 15 parts by mass, followed by further mixing.

According to at least one embodiment the thermal barrier material consists only of the antimony-doped tin oxide particles (B), and all ingredients of the thermal barrier film except for the antimony-doped tin oxide particles (B) are mixed in the step (1).

According to at least one embodiment, the method further includes the step of: (3) forming a mixture obtained in the step (2) into a film using a calender.

According to at least one embodiment, the polyvinyl chloride resin (A) includes 75 to 95 mass % of polyvinyl chloride (A-1), 1 to 10 mass % of ethylene-vinyl acetate copolymer (A-2), and 4 to 15 mass % of core shell rubber (A-3), wherein the sum of components (A-1), (A-2) and (A-3) is 100 mass %.

According to at least one embodiment, the polyvinyl chloride resin composition (P) includes an ultraviolet absorber (C) in an amount such that a mass ratio of the polyvinyl chloride resin (A) to the ultraviolet absorber (C) is 100 parts by mass:0.1 to 3 parts by mass.

According to another embodiment of the invention, there is provided a thermal barrier film, wherein the thermal barrier film is obtained by a method including the steps of: (1) mixing a polyvinyl chloride resin composition (P) including a polyvinyl chloride resin (A) using a blender, and (2) adding, to a mixture obtained by the step (1), a thermal barrier material including at least antimony-doped tin oxide particles (B) in an amount such that a mass ratio of the polyvinyl chloride resin (A) to the antimony-doped tin oxide particles (B) is 100 parts by mass:1.5 to 15 parts by mass, followed by further mixing.

According to another embodiment of the invention, there is provided a thermal barrier curtain, wherein the thermal barrier curtain includes a thermal barrier film as described above.

DETAILED DESCRIPTION

Embodiments of the invention provide a method for producing a thermal barrier film, in which the method includes the steps of: (1) mixing a polyvinyl chloride resin composition (P) containing a polyvinyl chloride resin (A) using a blender; and (2) adding, to the mixture obtained by the step (1), a thermal barrier material containing at least antimony-doped tin oxide particles (B) in an amount such that a mass ratio of the polyvinyl chloride resin (A) to the antimony-doped tin oxide particles (B) is 100 parts by mass:1.5 to 15 parts by mass, followed by further mixing.

Conventionally a thermal barrier film composed of a polyvinyl chloride resin composition is generally produced by: simultaneously mixing all ingredients using a blender; melt-kneading the obtained mixture using a kneader; and forming the obtained kneaded mixture into a film using a film-forming machine.

This conventional method is disclosed, for example, in JP 2002-369629 A mentioned above.

In contrast, in the method for producing a thermal barrier film, according to various embodiments of the invention, all ingredients except for the thermal barrier material containing at least the antimony-doped tin oxide particles (B) (which may be only the antimony-doped tin oxide particles (B)) are first mixed using a blender, and then the thermal barrier material containing at least the antimony-doped tin oxide particles (B) is added thereto, followed by further mixing.

By dividing the mixing into two steps in this way, a thermal barrier film in which the thermal barrier material containing antimony-doped tin oxide particles is well dispersed can be unexpectedly produced.

Step (1) described above can be performed using any blender. The "blender" herein is not specifically limited as long as it has a function of mixing a plurality of ingredients in the form of solid and/or liquid (the same applies to step (2) described below). Examples of the blender include a ribbon blender, a V-shaped rotary blender, a W-shaped rotary blender, a pan mixer, and a Henschel mixer (trade name). These blenders may be optionally combined for use.

The aforementioned polyvinyl chloride resin (A) serves as a matrix resin to have optional components such as an ultraviolet absorber (C) and the thermal barrier material containing the antimony-doped tin oxide particles (B) added in step (2), and to impart mechanical properties such as tensile strength and flexibility to the thermal barrier film.

Examples of the polyvinyl chloride resin (A) to be used according to various embodiments of the invention include polyvinyl chloride; and copolymers of vinyl chloride with other monomers that are copolymerizable with vinyl chloride, such as a vinyl chloride-vinyl acetate copolymer, a vinyl chloride-(meth)acrylic acid copolymer, a vinyl chloride-methyl (meth)acrylate copolymer, a vinyl chloride-ethyl (meth)acrylate copolymer, a vinyl chloride-maleic acid ester copolymer, a vinyl chloride-ethylene copolymer, a vinyl chloride-propylene copolymer, a vinyl chloride-styrene copolymer, a vinyl chloride-isobutylene copolymer, a vinyl chloride-vinylidene chloride copolymer, a vinyl chloride-styrene-maleic anhydride terpolymer, a vinyl chloride-styrene-acrylonitrile terpolymer, a vinyl chloride-butadiene copolymer, a vinyl chloride-isoprene copolymer, a vinyl chloride-chlorinated propylene copolymer, a vinyl chloride-vinylidene chloride-vinyl acetate terpolymer, a vinyl chloride-acrylonitrile copolymer, and a copolymer of vinyl chloride and one (or two or more) of various vinyl ethers. One or a mixture of two or more of these resins can be used as the polyvinyl chloride resin (A).

Further, the polyvinyl chloride resin (A) may include other resins that are generally used for polyvinyl chloride resin compositions, as long as they do not impair the purpose of the invention. Examples of the other resins include an ethylene-vinyl acetate copolymer, an ethylene-(meth)acrylic acid copolymer, an ethylene-methyl (meth)acrylate copolymer, and an ethylene-ethyl (meth)acrylate copolymer, and core shell rubbers such as a methacrylic acid ester-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylic acid ester graft copolymer, a methacrylic acid ester/acrylic acid ester rubber graft copolymer, and a methacrylic acid ester-acrylonitrile/acrylic acid ester rubber graft copolymer. One or a mixture of two or more of these resins may be used as the other resins.

According to at least one embodiment, the proportion of the polyvinyl chloride and/or the copolymer of vinyl chloride with the other copolymerizable monomers in the polyvinyl chloride resin (A) is not specifically limited, but is generally more than half (50 mass %) to 100 mass %, preferably 60 to 100 mass %, more preferably 70 to 100 mass %, most preferably 75 to 95 mass %.

According to at least one embodiment, the polyvinyl chloride resin (A) is particularly preferably a mixture containing 75 to 95 mass % of polyvinyl chloride (A-1), 1 to 10 mass % of an ethylene-vinyl acetate copolymer (A-2), and 4 to 15 mass % of a core shell rubber (A-3), where the sum of the components (A-1), (A-2), and (A-3) is 100 mass %.

According to at least one embodiment, this mixture has sufficient flexibility even if the amount of plasticizer to be mixed is reduced, or no plasticizer is used, where failure phenomena due to bleeding of the plasticizer are improved. Further, the aforementioned mixture has excellent cold resistance (i.e., impact resistance at low temperatures). Furthermore, the aforementioned mixture undergoes less variation of hardness in the temperature range for practical use assumed as agricultural materials.

Further, the aforementioned polyvinyl chloride resin composition (P) can further contain a plasticizer generally used for polyvinyl chloride resin compositions.

Examples of the plasticizer include: phthalate plasticizers such as di-2-ethyl hexyl phthalate, dibutyl phthalate, butyl hexyl phthalate, diheptyl phthalate, dioctyl phthalate, diisononyl phthalate, diisodecyl phthalate, dilauryl phthalate, dicyclohexyl phthalate, and dioctyl terephthalate; adipate plasticizers such as dioctyl adipate, diisononyl adipate, diisodecyl adipate, and di(butyl diglycol) adipate; phosphate plasticizers such as triphenylphosphate, tricresyl phosphate, trixylenyl phosphate, tri(isopropyl phenyl)phosphate, triethyl phosphate, tributyl phosphate, trioctyl phosphate, tri(butoxyethyl)phosphate, and octyl diphenyl phosphate; polyester plasticizers using ethylene glycol, diethylene glycol, triethylene glycol, 1,2-propylene glycol, 1,3-propylene glycol, 1,3-butanediol, 1,4-butanediol, 1,5-hexanediol, 1,6-hexanediol, neopentyl glycol, or the like, as a polyhydric alcohol, using oxalic acid, malonic acid, succinic acid, glutaric acid, adipic acid, pimelic acid, suberic acid, azelaic acid, sebacic acid, phthalic acid, isophthalic acid, terephthalic acid, or the like, as a dibasic acid, and using a monovalent alcohol or a monocarboxylic acid as a stopper, as needed; and other plasticizers such as tetrahydrophthalic acid plasticizers, azelaic acid plasticizers, sebacic acid plasticizers, stearic acid plasticizers, citric acid plasticizers, trimellitic acid plasticizers, pyromellitic acid plasticizers, biphenyltetracarboxylic acid ester plasticizers, and chlorine plasticizers.

Further, according to at least one embodiment, the aforementioned polyvinyl chloride resin composition (P) can further contain other additives generally used for polyvinyl chloride resin compositions, as long as they do not impair the purpose of the invention.

According to at least one embodiment, the additives are not specifically limited, but examples thereof include: chlorine scavengers such as hydrotalcite compounds, zeolite compounds, and metal soaps; antioxidants such as phosphorus antioxidants, phenolic antioxidants, and sulfur antioxidants; light stabilizers such as hindered amine light stabilizers; epoxy compounds such as epoxidized soybean oil; ultraviolet absorbers such as benzotriazole ultraviolet absorbers and benzophenone ultraviolet absorbers; β-diketone compounds; perchloric acid salts; polyhydric alcohols; pigments; lubricants; crosslinking agents; antistatic agents; antifogging agents; plate-out inhibitors; surface-treating agents; flame retardants; fluorescent agents; antifungal agents; disinfectants; metal deactivators; mold release agents; and processing aids.

In order to prevent deterioration of the resin material and protect workers, the polyvinyl chloride resin composition (P) preferably contains the ultraviolet absorber (C) (such as benzotriazole ultraviolet absorbers and benzophenone ultraviolet absorbers) in an amount such that a mass ratio of the polyvinyl chloride resin (A) to the ultraviolet absorber (C) is 100 parts by mass:0.01 to 10 parts by mass, more preferably 100 parts by mass:0.05 to 5 parts by mass, most preferably 100 parts by mass:0.1 to 3 parts by mass.

Further, the aforementioned polyvinyl chloride resin composition (P) can further contain fillers generally used for polyvinyl chloride resin compositions, as long as they do not impair the object of the present invention. Examples of the aforementioned fillers include light calcium carbonates, heavy calcium carbonates, hydrous magnesium silicates, and talcs.

According to at least one embodiment, the proportion of the polyvinyl chloride resin (A) in the polyvinyl chloride resin composition (P) is not specifically limited, but is generally more than half (50 mass %) to 100 mass %, preferably 60 to 100 mass %.

According to at least one embodiment, the conditions for the mixing in step (1) using a blender are not specifically limited, but are preferably general dry blending conditions, that is, conditions under atmospheric pressure at a low temperature such that solid substances contained in the polyvinyl chloride resin composition (P) are not melted or softened. Further, the mixing is preferably performed at a temperature that allows liquid substances contained in the polyvinyl chloride resin composition (P) to be rapidly absorbed by the polyvinyl chloride resin (A) (for example, at a temperature sensed to be warm by humans, typically about 20 to 40° C.). Further, the mixing in step (1) may be performed over a sufficient time for uniform dispersion of each of the components constituting the polyvinyl chloride resin composition (P) including the polyvinyl chloride resin (A).

Step (2) described above is a step of adding, to the mixture obtained in step (1) described above, the thermal barrier material containing at least the antimony-doped tin oxide particles (B) in an amount such that a mass ratio of the polyvinyl chloride resin (A) to the antimony-doped tin oxide particles (B) is 100 parts by mass:1.5 to 15 parts by mass, followed by further mixing.

In view of good balance of the desired properties, the mass ratio of the polyvinyl chloride resin (A) to the antimony-doped tin oxide particles (B) in this step is more preferably 100 parts by mass:2 to 10 parts by mass.

The "thermal barrier material" herein means a material having functions of efficiently absorbing near-infrared rays of sunlight for thermal barrier and having low visible light absorptivity (or high transmittance), and it contains at least the antimony-doped tin oxide particles (B). The antimony-doped tin oxide particles (B) are particularly excellent in these functions, and have functions of further reducing the heat transmission of the thermal barrier film and reducing heat dissipation.

The thermal barrier film obtained by various embodiments of the invention has low visible light absorptivity (high transmittance) while showing thermal barrier properties by efficiently blocking near-infrared rays. Accordingly, visible light enters the agricultural and horticultural facilities such as agricultural and horticultural greenhouses that use the thermal barrier film obtained by the present invention as scattered light or transmitted light, and therefore photosynthesis of plants is not inhibited. Further, the thermal barrier film obtained by the present invention has excellent heat retention properties due to its low heat transmission.

According to at least one embodiment, the thermal barrier material may consist only of the antimony-doped tin oxide particles (B), or may contain fine particles of other known thermal barrier compounds. The antimony-doped tin oxide particles (B) are also generally referred to as ATO, and are fine particles obtained by substituting $Sn^{4+}$ as a part of tin oxide crystal with $Sb^{5+}$. That is, the antimony-doped tin oxide particles (B) are tin oxide fine particles containing a small amount of antimony oxide. The antimony-doped tin oxide particles (B) have high transmittance typically in the visible region at a wavelength of about 380 nm to 780 nm, and have absorptivity in the near-infrared region at a wavelength of 900 nm or more.

Examples of the other known thermal barrier compounds include lanthanum hexaboride and titanium oxide. The proportion of the antimony-doped tin oxide particles (B) in the thermal barrier material is generally more than half (50 mass %) to 100 mass %, typically 60 to 100 mass %, preferably 70 to 100 mass %, more preferably 80 to 100 mass %, further preferably 90 to 100 mass %, particularly preferably 95 to 100 mass %, most preferably 100 mass %, in order to effectively express the aforementioned various functions.

According to at least one embodiment, the antimony-doped tin oxide particles (B) preferably have a fine particle size to an extent such that poor appearance such as incorporation of foreign substances does not occur in the thermal barrier film. The antimony-doped tin oxide particles (B) having an average primary particle size of 2 μm or less are generally used. The average primary particle size is more preferably 1 μm or less. The lower limit of the particle size is not particularly limited, but the minimum particle size of generally available particles is about 1 nm.

Whether to allow visible light to be incident as scattered light or as transmitted light through the thermal barrier film is optional depending on the intended use of the agricultural and horticultural facilities such as agricultural and horticultural greenhouses. In the case of allowing it to be incident as scattered light, the antimony-doped tin oxide particles (B) having an average primary particle size of 200 nm or more, preferably an average primary particle size of 300 nm or more, may be used. In the case of allowing it to be incident as transmitted light, the antimony-doped tin oxide particles (B) having an average primary particle size of 200 nm or less, preferably an average primary particle size of 100 nm or less, may be used.

According to at least one embodiment, the "average primary particle size" herein is a particle size at 50 mass % cumulated from the smallest particle size in the particle size distribution curve measured using a laser diffraction-scattering particle size analyzer MT3200II (trade name), manufactured, for example, by NIKKISO CO., LTD.

According to at least one embodiment, the amount of the antimony-doped tin oxide particles (B) is 1.5 to 15 parts by mass, more preferably 2 to 10 parts by mass, based on 100 parts by mass of the polyvinyl chloride resin (A). When the amount of the antimony-doped tin oxide particles (B) is 1.5 parts by mass or more, the film to be obtained sufficiently shows the near-infrared absorption function and the heat dissipation reducing function. The lower limit of the amount is more preferably 2 parts by mass or more, further preferably 4 parts by mass or more. On the other hand, use of the antimony-doped tin oxide particles (B) in an amount of 15 parts by mass or less allows the effect of improving the near-infrared absorption function and the heat dissipation reducing function to be maximally obtained. It is practically sufficient that the upper limit of the amount is 10 parts by mass or less, and the upper limit may be 8 parts by mass or less.

As a method for adding the thermal barrier material containing at least the antimony-doped tin oxide particles (B) to the mixture obtained in step (1), the total amount may be added thereto at a time, or may be added in multiple times.

According to at least one embodiment, the mixing in step (2) can be performed using any blender. In step (2), the same blender as used in step (1) may be used, or a different blender from the blender used in step (1) may be used.

Examples of the blender include a ribbon blender, a V-shaped rotary blender, a W-shaped rotary blender, a pan mixer, and a Henschel mixer (trade name). Further, these blenders may be optionally combined for use.

According to at least one embodiment, the conditions for mixing using a blender in step (2) are not specifically limited, but are preferably general dry blending conditions, that is, conditions under atmospheric pressure at a low temperature such that solid substances contained in the mixture obtained in step (1) and the thermal barrier material containing at least the antimony-doped tin oxide particles (B) are not melted or softened. Further, the mixing in step (2) may be performed over a sufficient time for uniform dispersion of each of the components constituting the mixture obtained in step (1) and the thermal barrier material containing at least the antimony-doped tin oxide particles (B).

Preferably, the mixture obtained in step (2) can be subsequently subjected to a melt-kneading step.

According to at least one embodiment, the method for melt-kneading the mixture obtained in step (2) is not specifically limited, and any known melt kneader and conditions can be used therefor. Examples of the melt kneader include batch kneaders such as pressure kneaders and mixers, extrusion kneaders such as co-rotating twin screw extruders and counter-rotating twin-screw extruders, and calender roll kneaders. Further, these melt kneaders may be optionally combined for use.

Step (3) of the present invention is a step of forming the mixture obtained in step (2) described above (preferably the mixture that have been further subjected to a melt-kneading step) into a film using a calender.

This film forming step may be performed using an extruder and a T-die, but is generally performed by forming a film using a calender because the polyvinyl chloride resin composition is susceptible to burning.

According to at least one embodiment, any known calender can be used therefor. Examples thereof include three-roll upright calenders, four-roll upright calenders, four-roll L calenders, four-roll inverse L calenders, and Z-roll calenders. Meanwhile, any known extruder can be used, and examples thereof include single screw extruders, co-rotating twin screw extruders, and counter-rotating twin-screw extruders. Any known T-die can be used, and examples thereof include manifold dies, fishtail dies, and coat hanger dies.

According to at least one embodiment, the thickness of the thermal barrier film thus obtained is not specifically limited, but may be, for example, about 5 to 1000 μm, typically 10 to 500 μm, more generally in the range of 20 to 400 μm.

According to at least one embodiment, the obtained thermal barrier film preferably has a visible light transmission at a wavelength of 380 to 780 nm of 40% or more, more preferably 55% or more.

Further, the thermal barrier film preferably has an infrared absorptivity at a wavelength of 900 to 2500 nm of 30% or more, more preferably 55% or more.

According to at least one embodiment, the "visible light transmission" herein is a ratio of the integrated area of the transmission spectrum at a wavelength of 380 to 780 nm to the integrated area of the transmission spectrum when the transmittance in the entire wavelength range of 380 to 780 nm is assumed to be 100%. Likewise, the "infrared absorptivity" herein is a ratio of the integrated area of the absorption spectrum at a wavelength of 900 to 2500 nm to the integrated area of the absorption spectrum when the absorptivity in the entire wavelength range of 900 to 2500 nm is assumed to be 100%.

According to at least one embodiment, the thermal barrier film described above can be suitably used as a material of agricultural and horticultural facilities, particularly, as a thermal barrier curtain therefor.

Examples of the thermal barrier curtain include one-piece film products of the aforementioned thermal barrier film and knitted fabrics of the aforementioned thermal barrier film in the form of a strip and other material in the form of a strip. The other material herein is not specifically limited, but examples thereof include one or a plurality of types of resin films, typically, polyethylene films (transparent films or optionally colored films with metal oxide pigments).

EXAMPLES

Next, the present invention will be described by way of examples and comparative examples.

The following examples are described for just illustrating the present invention, and the scope of the present invention is not limited to these examples at all.

Method for Measuring Physical Properties (i) Film Appearance

The surface of the obtained thermal barrier film was observed by visual inspection under irradiation with fluorescent light while the angle of incidence was variously changed, and the surface was evaluated according to the following criteria:

⊚: Less than 10 foreign substances or fish eyes with a size of 0.1 mm$^2$ or more defined in the dirt comparison chart were present per 1 m$^2$ of the film. No flow marks were observed.

Δ: 10 or more and less than 30 foreign substances or fish eyes with a size of 0.1 mm$^2$ or more defined in the dirt comparison chart were present per 1 m$^2$ of the film. Flow marks were observed.

x: 30 or more foreign substances or fish eyes with a size of 0.1 mm$^2$ or more defined in the dirt comparison chart were present per 1 m$^2$ of the film. Flow marks were observed.

(ii) Heat Transmission

Using a polystyrene foam plate having a thickness of 100 mm, a square-shaped vessel for heat transmission measurement having external dimensions of 600 mm in length×600 mm in width×330 mm in height (internal dimensions: 400 mm in length×400 mm in width×230 mm in height) was created. Within the vessel for heat transmission measurement, a temperature sensor, a humidity sensor, and a heater were installed.

In the vessel for heat transmission measurement, a beaker containing 100 ml of water was allowed to stand still. Then, a thermal barrier film cut into a size of 600 mm in length× 600 mm in width was attached so as to completely close the opening of the vessel for heat transmission measurement using a double-sided adhesive tape, and thereafter the vessel was allowed to stand still in a thermostatic bath adjusted to a bath temperature of 0° C. The thermostatic bath had internal dimensions of 1000 mm in length×800 mm in width×1000 mm in height.

Subsequently, the heater inside the vessel for heat transmission measurement was actuated by an output of 10 W. After the internal temperature of the vessel for heat transmission measurement had reached an equilibrium state, the internal temperature of the thermostatic bath (Ta), the internal temperature of the vessel (Tb), and the output of the heater (W) were measured.

The heat transmission K (unit: kcal/° C.·m$^2$·h) was calculated by the following formula. The time required to reach the equilibrium state was about one hour from the start of the actuation of the heater. Further, in the case where the internal temperature of the vessel for heat transmission measurement in the equilibrium state was below 10° C., the output of the heater was increased, and the measurement was performed again in the condition where the internal temperature was above 10° C.

$$K=W-\Delta T \cdot Kw \cdot Sw/\Delta T \cdot Sf$$

K: Heat transmission (kcal/° C.·m$^2$·h)
W: Cumulative output of the air heater (kcal·h)
ΔT=Ta−Tb (° C.)
Kw: Heat transfer coefficient of the polystyrene foam wall (0.57 kcal/° C.·m$^2$·h)
Sw: Surface area of the polystyrene foam wall inside the vessel for heat transmission measurement (0.528 m$^2$)

(iii) Infrared Absorptivity

The infrared absorptivity was calculated from the spectrum measured using a spectrophotometer "SolidSpec-3700 (trade name)", manufactured, for example, by SHIMADZU CORPORATION with an incidence angle of 0° as a ratio (%) of the integrated area of the absorption spectrum at a wavelength of 900 to 2500 nm to the integrated area of the absorption spectrum when the absorptivity in the entire wavelength range of 900 to 2500 nm was assumed to be 100%.

(iv) Visible Light Transmission

The visible light transmission was calculated from the spectrum measured using a spectrophotometer "SolidSpec-3700 (trade name)", manufactured by SHIMADZU CORPORATION with an incidence angle of 0° as a ratio (%) of the integrated area of the transmission spectrum at a wavelength of 380 to 780 nm to the integrated area of the transmission spectrum when the transmission in the entire wavelength range of 380 to 780 nm was assumed to be 100%.

Raw Materials Used (A) Polyvinyl chloride resin (A-1) Polyvinyl chloride resin, commercially available from KANEKA CORPORATION, with a polymerization degree of 800

(A-2) Ethylene-vinyl acetate copolymer "Soarblen CH (trade name)", commercially available from Nippon Synthetic Chemical Industry Co., Ltd., with a vinyl acetate content of 60 mass %

(A-3) Core-shell rubber "Metablen W-300A (trade name)", commercially available from Mitsubishi Rayon Co., Ltd.

(B) Antimony-doped tin oxide particles "ATO-P200 (trade name)", commercially available, for example, from Shanghai Huzheng Nano Technology Co., Ltd., with an average primary particle size of 200 nm.

(C) Benzotriazole ultraviolet absorber "TINUVIN326 (trade name)", commercially available, for example, from BASF Japan Ltd.

(D) Other optional components (D-1) Barium-zinc composite stabilizer, commercially available, for example, from ADEKA CORPORATION (D-2) Epoxidized soybean oil "ADEKA CIZAR O-130P (trade name)", commercially available, for example, from ADEKA CORPORATION

Example 1

The aforementioned components (A-1), (A-2), (A-3), (C), (D-1), and (D-2) were mixed in the amounts (parts by mass based on 100 parts by mass in total of the components (A-1) to (A-3)) shown in Table 1 using a ribbon blender under general dry blending conditions for 5 minutes so that sufficient uniformity was obtained. Next, the component (B) was added thereto in the amount shown in Table 1 (parts by mass), and the mixture was further mixed for 5 minutes so that the component (B) was uniformly dispersed.

The obtained mixture was melt-kneaded using a calender kneader, and the kneaded mixture was sent to an inverse L type 4-roll calender in a molten state as it was. Thus, a film with a thickness of 100 μm was obtained.

The results of the physical properties measured for this film are shown in Table 1.

Comparative Example 1

A film with a thickness of 100 μm was obtained in just the same manner as Example 1 except that all ingredients were simultaneously loaded into the ribbon blender in the amounts (parts by mass) shown in Table 1, and were mixed for 10 minutes. The results of the physical properties measured for this film are shown in Table 1.

Example 6

The film of Example 1 cut to a width of 4 mm, a transparent polyethylene film (with a thickness of 50 μm and a visible light transmission of 90%) cut to a width of 4 mm, and a white polyethylene film (with a thickness of 50 μm and a visible light transmission of 30%) cut to a width of 4 mm and colored with a titanium oxide pigment were repeatedly arranged in this order, and were knitted with a polyester spun yarn using a Raschel knitting machine. Thus, a processed film was obtained.

The heat transmission as measured in accordance with the aforementioned procedure (ii) was 6.3 kcal/° C.·m²·h.

Comparative Example 3

The aforementioned transparent polyethylene film (with a thickness of 50 μm and a visible light transmission of 90%) cut to a width of 4 mm and the aforementioned white polyethylene film (with a thickness of 50 μm and a visible light transmission of 30%) cut to a width of 4 mm were repeatedly arranged in this order, and were knitted with a polyester spun yarn using a Raschel knitting machine. Thus, a processed film was obtained.

The heat transmission as measured in accordance with the aforementioned procedure (ii) was 7.3 kcal/° C.·m²·h.

TABLE 1

| Component | Example 1 Parts by mass | Comparative Example 1 Parts by mass | Example 2 Parts by mass | Example 3 Parts by mass | Example 4 Parts by mass | Example 5 Parts by mass | Comparative Example 2 Parts by mass |
| --- | --- | --- | --- | --- | --- | --- | --- |
| (A-1) | 86 | 86 | 86 | 86 | 77 | 94 | 86 |
| (A-2) | 4 | 4 | 4 | 4 | 8 | 1 | 4 |
| (A-3) | 10 | 10 | 10 | 10 | 15 | 5 | 10 |
| (B) | 6 | 6 | 2 | 10 | 6 | 6 | 0.5 |
| (C) | 1.0 | 1.0 | 1.0 | 1.0 | 1.0 | 1.0 | 1.0 |
| (D-1) | 4.6 | 4.6 | 4.6 | 4.6 | 4.6 | 4.6 | 4.6 |
| (D-2) | 5 | 5 | 5 | 5 | 5 | 5 | 5 |

| Measured physical property | Evaluated result | Mass loading Evaluated result | Evaluated result | Evaluated result | Evaluated result | Evaluated result | Evaluated result |
| --- | --- | --- | --- | --- | --- | --- | --- |
| (i) | ◎ | X | ◎ | ◎ | ◎ | ◎ | ◎ |
| (ii) | 5.4 | 5.5 | 6.3 | 4.7 | 5.5 | 5.4 | 6.9 |
| (iii) | 60 | 59 | 36 | 77 | 59 | 61 | 25 |
| (iv) | 60 | 58 | 70 | 45 | 41 | 75 | 75 |

Examples 2 to 5

A film with a thickness of 100 μm was obtained in just the same manner as Example 1 except that the amounts of the respective components mixed were changed as shown in Table 1. The results of the physical properties measured for these films are shown in Table 1.

Comparative Example 2

A film with a thickness of 100 μm was obtained in just the same manner as Example 1 except that the amount of the component (B) mixed (antimony-doped tin oxide particles) was changed to 0.5 parts by mass based on 100 parts by mass in total of the components (A-1) to (A-3). The results of the physical properties measured for this film are shown in Table 1.

The thermal barrier films of Examples 1 to 5 obtained by the method of the present invention had good appearance, and exhibited suitable values of the heat transmission, the infrared absorptivity, and the visible light transmission as a thermal barrier film.

On the other hand, the thermal barrier film of Comparative Example 1 in which all ingredients were simultaneously loaded into the ribbon blender had poor appearance. Further, the thermal barrier film of Comparative Example 2 in which the amount of the antimony-doped tin oxide particles was reduced had a reduced infrared absorptivity. Further, the thermal barrier film of Comparative Example 2 turned out to be inferior to the thermal barrier films of the other examples also in that it had high heat transmission (accordingly, low heat retention).

Further, the thermal barrier film of Comparative Example 1 was substantially comparable to the film of Example 1 in the heat transmission, the infrared absorptivity, and the visible light transmission. However, each of these physical property values significantly varied in every implementation. Such significant variations in physical property values were considered to be caused due to insufficient dispersion of the thermal barrier material. As a result, the thermal barrier film of Comparative Example 1 is determined to be unsuitable as an industrial product because of its difficulty in satisfying product specifications in each production.

A thermal barrier film to be obtained by the production method according to various embodiments of the invention expresses thermal barrier properties by efficiently blocking near-infrared rays, and has excellent heat retention properties due to its high visible light transmittance and low heat transmission. Therefore, such a thermal barrier film is suitable as a material such as a roofing material and a wall material for agricultural and horticultural facilities such as agricultural and horticultural greenhouses.

The invention claimed is:

1. A method for producing a thermal barrier film, comprising the steps of:
   (1) mixing a polyvinyl chloride resin composition (P) comprising a polyvinyl chloride resin (A) and an ultraviolet absorber (C) using a blender, an amount of the ultraviolet absorber (C) being such that a mass ratio of the polyvinyl chloride resin (A) to the ultraviolet absorber (C) is 100 parts by mass:0.1 to 3 parts by mass; and
   (2) adding, to a mixture obtained by the step (1), a thermal barrier material comprising at least antimony-doped tin oxide particles (B) in an amount such that a mass ratio of the polyvinyl chloride resin (A) to the antimony-doped tin oxide particles (B) is 100 parts by mass:1.5 to 15 parts by mass, followed by further mixing,
   wherein the polyvinyl chloride resin (A) comprises 75 to 95 mass % of polyvinyl chloride (A-1), 1 to 10 mass % of ethylene-vinyl acetate copolymer (A-2), and 4 to 15 mass % of core shell rubber (A-3), wherein the sum of components (A-1), (A-2) and (A-3) is 100 mass %.

2. The method according to claim 1, wherein the thermal barrier material consists only of the antimony-doped tin oxide particles (B), and all ingredients of the thermal barrier film except for the antimony-doped tin oxide particles (B) are mixed in the step (1).

3. The method according to claim 1 or 2, further comprising the step of:
   (3) forming a mixture obtained in the step (2) into a film operating a calender.

4. A thermal barrier film, wherein the thermal barrier film is obtained by the method according to claim 1.

5. A thermal barrier curtain, wherein the thermal barrier curtain comprises the thermal barrier film according to claim 4.

* * * * *